Oct. 3, 1967     F. NAUMANN     3,344,689

BEARING STRUCTURE

Filed Aug. 12, 1964

INVENTOR.
FRITZ NAUMANN

BY Dicke & Craig

ATTORNEYS 3,344,689
BEARING STRUCTURE
Fritz Naumann, Unterensingen, Kreis Nurtingen, Germany, assignor to Daimler-Benz Aktiengesellschaft, Stuttgart-Unterturkheim, Germany
Filed Aug. 12, 1964, Ser. No. 389,117
4 Claims. (Cl. 74—801)

The present invention relates to an arrangement of a radial needle bearing especially intended for planet gears of motor vehicle change-speed transmissions, whose bearing needles are arranged without cage between the bolt and gear and in which abutment disks are provided.

With this arrangement of bearing needles and abutment disks, the latter transmit axial forces which occur by offset of the bearing needles as a result of radial play under certain load conditions. The abutment surfaces are destroyed thereby which is also known by the expression "binding" or "seizing."

It is intended to avoid by the present invention a destruction of the abutment disks. The present invention solves this task by the arrangement of at least two abutment disks of different degrees of hardness on each end face of the gear wheel whereby the harder abutment disks abutting against the end faces of the gears are matched in hardness to the bearing needles.

By the use of abutment disks made of soft bearing metal having favorable sliding characteristics the wear, that is, the "seizing" and "binding" is avoided, whereas the harder abutment disks, consisting preferably of spring steel, prevent the penetration of the needle heads into the soft bearing metal.

According to a further feature of the present invention, the abutment disks are rotatably arranged on the shaft with axial play so that the relative velocity of the sliding surfaces is reduced and the planet gears obtain a certain freedom of axial movement.

Accordingly, it is an object of the present invention to provide a radial needle bearing of the type described above which eliminates the shortcomings and drawbacks encountered with the prior art constructions.

It is another object of the present invention to provide a radial needle bearing without bearing cage, for use in particular with change-speed transmissions, which effectively increases the length of life of the bearing assembly without in any way impairing the bearing qualities thereof.

A further object of the present invention resides in the provision of radial needle bearings, particularly for supporting gears on gear carriers without the use of bearing cages for the needle bearings, which prevent premature destruction of the bearings yet permit a certain axial freedom of movement of the gears.

Figure 1:
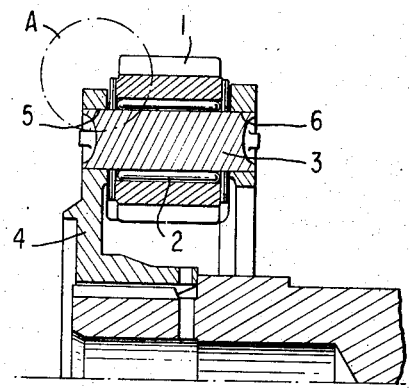
Figure 2:
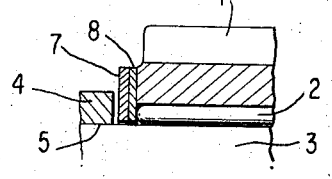

These and other objects, features, and advantages of the present invention will become more obvious from the following description when taken in connection with the accompanying drawing which shows, for purposes of illustration only, one embodiment in accordance with the present invention, and wherein FIGURE 1 is a partial axial longitudinal cross sectional view through the planet carrier with radial needle bearing in accordance with the present invention, and, FIGURE 2 is a partial cross sectional view, on an enlarged scale, illustrating the details indicated by the circle in FIGURE 1 and designated by reference character A.

Referring now to the drawing wherein like reference numerals are used throughout the two views to designate like parts, the planet gear 1 is supported with axial play at the planet gear carrier 4 by way of bearing needles 2 and planet gear bolt 3, whereby the planet gear bolt 3 is guided in bores 5 and 6 of the planet gear carrier 4 and is secured at the ends thereof by expansion. Soft abutment disks 7 are rotatably arranged between planet gear carrier 4 and planet gear 1 on the planet gear bolt 3. Hard abutment disks 8 are provided between the soft abutment disks 7 and the planet gear 1, which abutment disks 8 may rotate in unison with the planet gear 1.

The arrangement of abutment disks of different materials and different hardness made in accordance with the present invention constitute with a radial needle bearing a simple and safe measure to prevent the destruction of the abutment disks by wear, seizing and binding.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. In a planet gear change-speed transmission assembly having at least one planet gear rotatably supported on a bolt mounted on a planet gear carrier, wherein the gear is supported on the bolt by means of a plurality of bearing needles disposed for direct engagement with a surface of said gear and of said bolt, the improvement comprising:
   at least two abutment discs of different hardness rotatably mounted on said bolt and positioned axially between each end face of said gear and a surface of said planet gear carrier,
   each of said abutment discs being arranged with axial play with respect to said bolt and to the other abutment discs, thus providing for relative rotation between said abutment discs at each end face of said gear,
   the relatively harder abutment disc, which is disposed to contact the end face of said gear, having a hardness approximately matching the hardness of said bearing needles.
2. A combination according to claim 1, wherein the abutment disk with the lesser hardness is made of bearing metal.
3. A combination according to claim 1, wherein the abutment disk with higher hardness is made of spring steel.
4. A combination according to claim 1, wherein:
   the abutment disk with the lesser hardness is made of bearing metal, and
   the abutment disk with higher hardness is made of spring steel.

References Cited
UNITED STATES PATENTS

| 441,455 | 11/1890 | Walker | 308—164 |
| 999,806 | 8/1911 | Latham | 308—216 |
| 1,165,594 | 12/1915 | Hani | 308—164 |
| 1,715,267 | 5/1929 | Ayers | 308—186 |
| 1,999,916 | 9/1934 | Richardson | 308—179 |
| 2,901,925 | 9/1959 | Gunderson et al. | 74—801 X |
| 3,050,351 | 8/1962 | Kempf | 308—174 |

MARTIN P. SCHWADRON, Primary Examiner.
DAVID J. WILLIAMOWSKY, Examiner.
N. ABRAMS, R. F. HESS, Assistant Examiners.